(12) United States Patent
Lamy-Bergot et al.

(10) Patent No.: US 8,300,708 B2
(45) Date of Patent: Oct. 30, 2012

(54) METHOD ALLOWING COMPRESSION AND PROTECTION PARAMETERS TO BE DETERMINED FOR THE TRANSMISSION OF MULTIMEDIA DATA OVER A WIRELESS DATA CHANNEL

(75) Inventors: Catherine Lamy-Bergot, Paris (FR); Cyril Bergeron, Paris (FR)

(73) Assignee: Thales, Neuilly sur Seine (FR)

( * ) Notice: Subject to any disclaimer, the term of this patent is extended or adjusted under 35 U.S.C. 154(b) by 713 days.

(21) Appl. No.: 12/306,766

(22) PCT Filed: Jun. 29, 2007

(86) PCT No.: PCT/EP2007/056580
§ 371 (c)(1),
(2), (4) Date: Jul. 29, 2009

(87) PCT Pub. No.: WO2008/000822
PCT Pub. Date: Jan. 3, 2008

(65) Prior Publication Data
US 2009/0304070 A1   Dec. 10, 2009

(30) Foreign Application Priority Data

Jun. 29, 2006   (FR) ..................................... 06 05882
Oct. 13, 2006   (FR) ..................................... 06 08992

(51) Int. Cl.
  *H04N 7/12*   (2006.01)
  *H04N 11/02*  (2006.01)
  *H04N 11/04*  (2006.01)
(52) U.S. Cl. .............................. 375/240.27; 375/240.02
(58) Field of Classification Search ............. 375/240.02, 375/240.27
See application file for complete search history.

(56) References Cited

U.S. PATENT DOCUMENTS

| | | | | |
|---|---|---|---|---|
| 6,154,489 | A * | 11/2000 | Kleider et al. | 375/221 |
| 7,006,568 | B1 * | 2/2006 | Gu et al. | 375/240.11 |
| 2004/0170335 | A1 * | 9/2004 | Pearlman et al. | 382/240 |
| 2007/0019764 | A1 * | 1/2007 | Yang et al. | 375/347 |

FOREIGN PATENT DOCUMENTS

| | | |
|---|---|---|
| EP | 1603339 | 12/2005 |
| KR | 20040073628 | 8/2004 |
| WO | WO-02/37700 | 5/2002 |
| WO | WO-2004/012458 | 2/2004 |
| WO | WO-2004/056028 | 7/2004 |

OTHER PUBLICATIONS

Bernard et al., "Speech Transmission Using Rate-Compatible Trellis Codes and Embedded Source Coding," IEEE Transactions on Communications, IEEE Service Center, Piscataway, NJ, US, vol. 50, No. 2, Feb. 2002. pp. 309-320.

* cited by examiner

*Primary Examiner* — David Czekaj
*Assistant Examiner* — Chikaodili E Anyikire
(74) *Attorney, Agent, or Firm* — Stroock & Stroock & Lavan LLP

(57) ABSTRACT

A method allowing operating parameters, such as the compression ratio and/or the protection ratio for a multimedia data transmission channel to be determined, wherein it includes at least one step during which several values of sensitivity are determined for pairs of values fixed source bit-rate, desired compression ratio, a step where the different values obtained for an operating point of the fixed channel are compared with one another, and a step where the optimum sensitivity value is selected, the sensitivity value being defined taking the desired source bit-rate and the compression ratio into account.

18 Claims, 5 Drawing Sheets

METHOD ALLOWING COMPRESSION AND PROTECTION PARAMETERS TO BE DETERMINED FOR THE TRANSMISSION OF MULTIMEDIA DATA OVER A WIRELESS DATA CHANNEL

This is a U.S. National Phase application under 35 U.S.C. §371 of International Application No. PCT/EP2007/056580, filed Jun. 29, 2007 and claims benefit of French Patent Application No. 0605882, filed Jun. 29, 2006 and French Patent Application No. 0608992, filed Oct. 13, 2006, all of which are herein incorporated by reference in their entireties. The International Application was published in French on Jan. 3, 2008 as WO 2008/000822 under PCT Article 21(2).

FIELD OF THE INVENTION

The invention relates to a method and a device allowing values of the operating parameters, such as the compression ratio and the protection ratio, to be determined for an optimized operating point in the framework of a multimedia data transmission over a wireless channel.

It is for example used in video data transmissions complying with the H.264/AVC standard.

BACKGROUND OF THE INVENTION

The transmission of multimedia data within channels of limited bandwidth or within channels whose errors are predictable has led to the use of the Shannon separation principle being reconsidered, which recommends that the source coding (compression) and the channel coding (protection) be designed separately.

However, in order to meet the compatibility with existing standards and the deployment of existing architectures where network layers can be present between the source and channel coders, the compression and the protection are kept separated although applied in cooperation. Joint channel source coding ensures that the impact of the errors, practically unavoidable in wireless channels, are taken into consideration by efficiently combining the compression and the protection with regard to the visual display. The conventional algorithms for source bit-rate control proposed in the absence of transmission errors are based on the assumption that the error correction coding (or FEC for Forward Error Correction) tools allow the arrival of packets free from errors at the video decoder. In spite of the particular interest in wireless transmissions or broadcast, these solutions do not take into account either the significant effects of severe distortion introduced by an unavoidable residual bit-error probability in narrow-band transmissions, nor the different sensitivities of the bitstreams.

A first tandem joint coding solution, which follows the principle that video decoders suffer chiefly from packet losses, deals with the question of source bit-rate control in the absence of transmission errors, and the establishment of packet pruning mechanisms (discarded packets). This network-oriented approach does not take into account the possibilities offered by more recent transport protocols such as UDPlite (User Datagram Protocol light) or DCCP (Data Congestion Control Protocol) that enable erroneous payloads to be transferred to the application level, where they are submitted to decoders able to use them.

A second family of tandem joint coding schemes uses FEC tools in order to ensure that the probabilities of bit or packet errors seen by the video decoder are situated below a given threshold. The most efficient schemes choose the channel bit-rates depending on the analysis of the sensitivity of the data streams, the key problem being the evaluation of the sensitivity. The global approaches, based on a discrete cosine transform (or DCT [1]) compression or dedicated for given prediction standards [2] [3], propose a definition of the sensitivity and of its impact on the distortion based on an analytical formula for each frame [1][2] or by an approach of the 'water-filling' optimization type. However, these approaches require either an adjustment of the model thanks to numerous tests, hindering easy deployment in practical situations, or do not take the different dependences existing in the bitstream totally into account, which could be due to their generic approach not linked to a standard and/or a given application.

The method according to the invention is notably based on the use of a semi-analytical model predicting the distortion in multimedia data.

In the case of the H.264/AVC standard, the distortion is calculated by estimating the impact of the errors in the different partitions/frames, depending on their respective sensitivity to the errors and on the influence of prediction in order to calculate the distortion of a predicted frame and of a group of images (GOP or Group of Pictures).

When it is used with FEC protection, the method allows the allocation of protection to be specified that minimizes the distortion of a GOP or the distortion of the video sequence (which is a series of several GOPs), by application of the protection bit-rate adapted to the level of sensitivity.

The word "slice" defines a partition known to those skilled in the art.

SUMMARY OF THE INVENTION

The invention relates to a method allowing operating parameters, such as the compression ratio and/or the protection ratio for a multimedia data transmission channel, to be determined, wherein it includes at least one step during which several values of sensitivity are determined for pairs of values fixed source bit-rate, desired compression ratio, a step where the different values obtained for an operating point of the fixed channel are compared with one another, and a step where the optimum sensitivity value is selected, the sensitivity value being defined taking the desired source bit-rate and the compression ratio into account.

The invention also relates to a device allowing operating parameters, such as the compression ratio and/or the protection ratio pour a multimedia data transmission channel, to be determined, wherein it includes at least one adaptation module adapted to receive information on the state of the channel and the information on efficiency available for coders, and to generate coding rules, such as the values of the video compression ratio and of the protection ratio by implementing the steps of the method comprising one of the aforementioned features.

The invention notably has the advantages of optimizing the compression and protection ratio for an operating point optimized for the wireless transmission of multimedia data, in order to obtain an improved final quality, taking the form of a better visual display or, objectively (by the objective measurement), in terms of PNSR or MSE.

BRIEF DESCRIPTION OF THE DRAWINGS

Other features and advantages of the invention will become more clearly apparent upon reading the description that follows presented by way of non-limiting illustration and appended with the figures that show.

DETAILED DESCRIPTION OF THE PRESENT INVENTION

Figure 1:
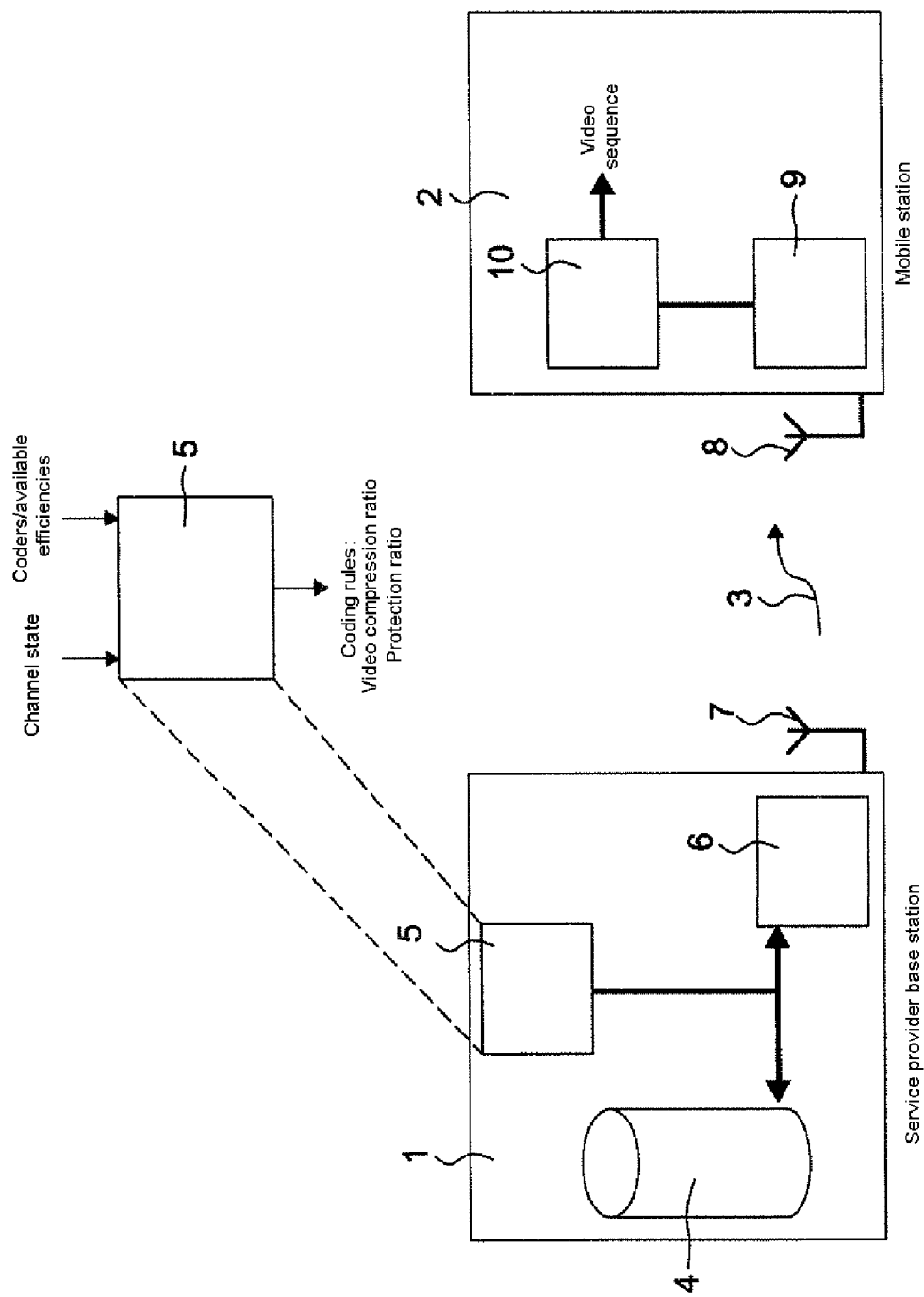
FIG. 1: a schematic functional diagram of modules used to implement the steps of the method.

Before expounding the steps implemented by the method according to the invention, a few points are recalled on the manner of estimating the sensitivity. Estimation of the expected mean value for the end-to-end distortion (in other words including the effect of the compression and the protection) $\hat{D}_{S+C}$ after the source and channel coding operations for a video sequence.

For reasons of simplification, each frame is coded within one single slice or NAL (abbreviation of Network Abstraction Layer in the H.264/AVC standard), although the results can be extended to the cases of multiple slices, as will for example be seen in data partitioning (or DP, embodiment specific to the H.264/AVC standard).

The distortion $\hat{D}_{S+C}$ for a frame (or NAL) transmitted within a channel with errors can be deduced by taking into account the different or various elementary distortions $D_i$ corresponding to the error probability $P_i$ associated with an error event.

$$\hat{D}_{S+C} = \sum_{i \in IN} D_i \cdot P_i$$

where IN is the set of natural integers.

Theoretically, each bit error, together with their different or various combinations, corresponds to an "error event" whose impact on the resulting decoded image (with or without error correction) should be taken into account. For the modeling, the hypothesis is put forward that the errors may be grouped and averaged, considering the distortion resulting from the errors in the frame, depending on whether they lead to a loss of the NAL with $D_{loss}$ or to a partial corruption of the NAL with $D_{corr}$, and the distortion inherent to the compression operation, which even affects the NALs received correctly with $D_o$. For $P_c$ (or $P_l$) the probability of correctly receiving (or of completely losing) a NAL, the joint source channel end-to-end distortion, or sensitivity, is obtained by:

$$\hat{D}_{S+C} = P_c \cdot D_o + P_l D_{loss} + (1-P_c-P_l) \cdot D_{corr} \quad (1)$$

The resulting distortion will be expressed in terms of Mean Squared Error (MSE) or of Peak Signal-to-Noise Ratio (PSNR):

$$MSE = \sum_{i=1}^{M} \sum_{j=1}^{Q} \frac{(pl^*(i,j) - pl(i,j))^2}{M \times Q}$$

$$PSNR = 10\log_{10}\left(\frac{255^2}{MSE}\right)$$

with M, Q the width and the height of the video frame, and pl(i, j) (or pl*) the luminance of the pixels of the original frame (or of the reconstructed frame)

Expression for the Probabilities Defendant on the Transmission Channel

By considering, as an example, a channel with no memory introducing errors with a bit-error probability $P_e$, such as the BSC (Binary Symmetric Channel) or the AWGN (Additive White Gaussian Channel), the error probability for the transmission channel may be expressed in the following manner:

$$P_c = (1-P_e)^n$$

where n is the size of the frame expressed in bits and $$P_e = \frac{1}{2}\text{erfc}\left(\sqrt{\frac{E_S}{N_0}}\right)$$

for a signal/noise ratio $SNR=E_S/N_0$ with no channel coding.

The probability $P_l$ of losing a NAL is expressed using [4], where it was found that the Intra and Predicted H.264/AVC frames could be partially noisy (fraction p of the frame) without there being de-synchronization of the data stream, only leading to visual errors (artifacts) in the reconstructed image: the assumption is made that the frames containing more errors than the fraction p are lost frames, whereas the frames whose noisy fraction is less than p are corrupted frames, which leads to a probability of loss:

$$P_l = 1-(1-P_e)^{(1-p)n},$$

resulting in a sensitivity value:

$$\hat{D}_{S+C} = (1-P_e)^n D_o + (1-(1-P_e)^{(1-p)n}) \cdot D_{loss} + ((1-P_e)^{(1-p)n} - (1-P_e)^n) \cdot D_{corr} \quad (2)$$

Intra Frames I and Predicted Frames P

Taking into account the empirical observation, according to which $MSE_{corr} \approx MSE_O$ for the I and P frames coded according to the H.264/AVC standard, and the estimation made in [4] of the fraction p, for the Intra frames equal to $1-\beta_0 \approx 0.25$ and $1-\beta_i \approx 0.15$ for the $i^{th}$ predicted frame $P_i$, the sensitivity for an Intra frame $\hat{D}_{Intra}$ is expressed as:

$$\hat{D}_{Intra} = (1-P_e)^{\beta_0 n} \cdot D_o + (1-(1-P_e)^{\beta_0 n}) \cdot D_{loss} \quad (3)$$

In a similar manner, the expression of the sensitivity for the $i^{th}$ predicted frame $P_i$ of a GOP, when the preceding frames are correctly detected, is obtained by:

$$\hat{D}_{P_i} = (1-P_e)^{\beta_i n_i} \cdot D_{o_i} + (1-(1-P_e)^{\beta_i n_i}) \cdot D_{loss_i} \quad (4)$$

with $n_i$ the size of the $i^{th}$ P-frame, $D_{o_i}$ (resp. $D_{loss_i}$) the distortion observed when the frame is correct (or lost) when the preceding frames are correct.

The sensitivity of an H.264/AVC coded frame is then derived by estimating only the distortion obtained for the best (absence of transmission error) and the worst (loss of frame) transmission conditions and the frame length.

FIG. 1 shows schematically an example of a system adapted to execute the steps according to the invention.

The example in FIG. 1 includes a base station 1 of the service provider and a mobile station 2 exchanging data via a wireless channel 3.

The base station 1 includes, for example, a video coder/server 4, an adaptation/allocation module 5 and radio access layers 6.

The mobile station 2 includes network access layers 9 and a video decoder 10 generating the video sequence.

The stations are respectively equipped with emission/reception antennas 7, 8.

The adaptation/allocation module 5 receives, for example, the information on the state of the channel and the information on efficiency available for the coders, it generates coding rules, in particular the values of the video compression ratio and of the protection ratio, by implementing the steps described hereinafter of the method according to the invention.

The implementation of such a system is carried out, for example, in the following manner.

The adaptation/allocation module embodying the invention receives the transmission channel state information, together with information on the coders and available efficiencies for the video compression and the protection by the radio access layer. In the case where a pre-coded video data server is considered, the module can therefore receive the accurate source sensitivity information (or SSI) in terms notably of exact sizes of the different partitions or slices for each of the embodiments of the pre-coded streams. This module then determines the best compression ratio, protection ratio pair to be employed for an overall bit-rate on the given transmission channel, by means of the estimated calculation of the resulting distortion for the sequence in question. The coding rules are then transmitted for application to the video coder/server and to the radio access layer which will carry out the compression and the protection of the data according to these rules in order to be sent over the transmission channel. The coded data then travel over the wireless transmission channel before being received by the receiver that will perform the error correction decoding operation and the video decoding operation producing the decoded video sequence.

The method is notably based on the use of a given sensitivity value taking the source bit-rate and the desired data protection into account, which allows an optimal compression/protection pair to be defined for an operating point for the transmission channel in question.

Determination of the Sensitivity of a GOP Composed of an Intra Frame I Followed by N Predicted Frames P or, More Generally, by a Group of Frames.

In practice, P-frames and their sensitivity will depend on the preceding frames: if a frame P is incorrectly received, then the following frames, even if they are transmitted correctly will not be reconstructed correctly. The following hypothesis is adopted: if a frame is lost, its contribution to the distortion of any following frames is negligible. The impact caused by the fact that the preceding frames are received incorrectly is therefore taken into account by using the conditional probability of having the correct preceding frames.

Using equations Eq. (3) and (4) with $\beta_0=\alpha$, the distortion for a GOP may be expressed in the following manner:

$$\hat{D} = P_c^{(\beta_0)} \cdot D_{o_0} + (1 - P_c^{(\beta_0)}) \cdot D_{loss_0} \quad (5)$$
$$= P_c^{(\beta_0)}[P_c^{(\beta_1)}D_{o_1} + (1 - P_c^{(\beta_1)})D_{loss_1}] + (1 - P_c^{(\beta_0)})D_{loss_0}$$
$$= \ldots$$
$$= \left(\prod_{i=0}^{N} P_c^{(\beta_i)}\right) D_{o_N} + \sum_{i=0}^{N}\left[\prod_{j=0}^{i-1} P_c^{(\beta_j)}(1 - P_c^{(\beta_i)})D_{loss_i}\right]$$

with $P_c^{(\beta_i)}$ the probability that the $i^{th}$ frame, $D_{o_i}$ (or $D_{loss_i}$) is well received, the mean GOP distortion observed when the frames 0 (Intra) to i are correct (or observed when the $i^{th}$ frame is lost). Of course, these conditional probabilities could be calculated more accurately if the complete information on the dependency existing between the frames (for example the numbers of the frames used as reference for each frame) were available.

By considering the example of a channel with no memory introducing errors with an error probability for a bit $P_e$, the probability of having correct reception is $P_c^{(\beta_j)}=(1-P_e)^{\beta_j \cdot n_j}$:

$$\hat{D}_{gop} = \prod_{i=0}^{N} (1 - P_e)^{\beta_i n_i} \cdot D_o + \quad (6)$$
$$\sum_{i=0}^{N}\left[\prod_{j=0}^{i-1}(1 - P_e)^{\beta_j \cdot n_j} \cdot (1 - (1 - P_e)^{\beta_i \cdot n_i}) \cdot D_{loss_i}\right]$$

with $D_o = D_{o_N}$ the mean distortion for a GOP.

Data Partitioning Model

When the data stream is divided into several partitions or "partitioned" according to the Data Partitioning Mode of the H.264/AVC standard, each predicted frame P is transmitted in, at the most, three "slices" (NAL-A, NAL-B, NAL-C), each slice being dependant on the preceding slices coding the same part of the image, for a correct decoding to take place. In order to take the dependency between slices into account, the assumption is made that, in the case where a partition is lost, the resulting distortion for an incorrectly received following partition is negligible. The sensitivity of a GOP DP is deduced from the generalized expression of equation (6):

$$\hat{D}_{gop_{DP}} = \quad (7)$$
$$\prod_{i=0}^{N}\prod_{k=1}^{3}(1 - P_e)^{(1-\beta_{i,k})n_{i,k}} \cdot D_o + \sum_{i=0}^{N}\sum_{k=1}^{3}\left[\prod_{j=0}^{N}\prod_{l=1}^{k-1}(1 - P_e)^{\beta_{j,l}n_{j,l}}\right.$$
$$\left.\prod_{j=0}^{i-1}(1 - P_e)^{\beta_{j,k}n_{j,k}}\left(1 - (1 - P_e)^{(1-\beta_{i,k})n_{i,k}}\right)D_{loss_{i,k}}\right]$$

with $n_{i,k}$ the length of the $i^{th}$ frame of the $k^{th}$ partition, resulting in a distortion $D_{loss_{i,k}}$ if the partition is lost and $$n_i = \sum_{k=1}^{3} n_{i,k}.$$

Frame Shuffle Model

Figure 5:
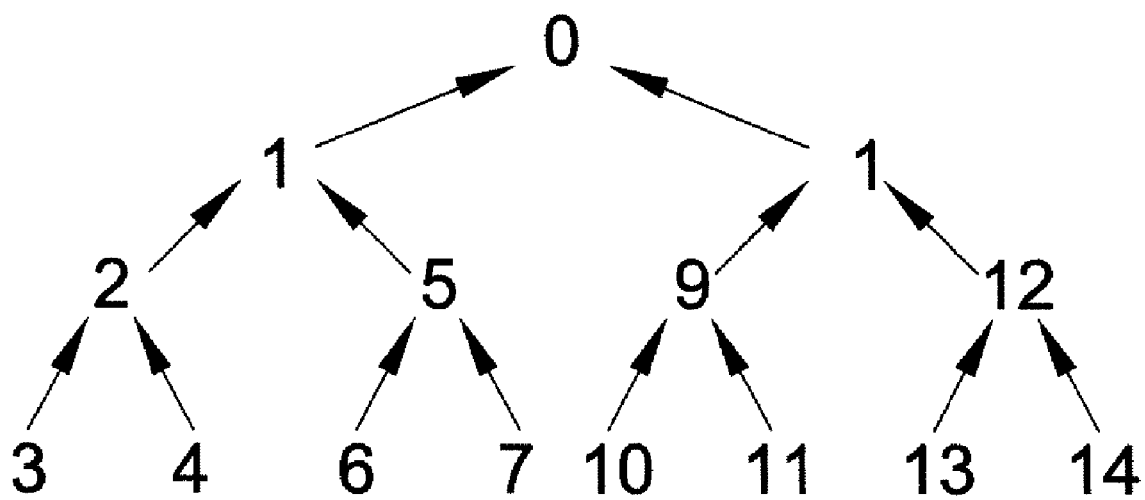
FIG. 5: the shuffle figure corresponding to the tree mode on a GOP.

When the data stream is compressed by using a particular method such as the frame shuffle method proposed in [6][7], the dependency between the different picture frames changes. Thus, the frame of interest no longer necessarily depends on the preceding frames in the order of display, but on the choice according to the shuffle matrix applied of all or part of the preceding frames in the order of compression coding. In the particular case where the shuffle is carried out in order to offer granularity [6] to the coded data stream, for example with the "Tree" shuffle mode (illustrated in [7] and in FIG. 5), the conditional probability used in equation (6) should therefore be modified in order to only consider the frames on which the current frame depends; typically, in the example of the "Tree" shuffle mode, only its direct superiors in the highest refinement levels. This yields the formula (8)

$$\hat{D}_{gop} = \prod_{i=0}^{N} (1 - P_e)^{\beta_i n_i} \cdot D_o + \sum_{i=0}^{N} \left[ \prod_{j,j \in FS_i}^{N} (1 - P_e)^{\beta_i n_j} \cdot (1 - (1 - P_e)^{\beta_i n_j}) \cdot D_{loss_i} \right] \quad (8)$$

where $FS_i$ is the set of the frames on which the frame i depends, this set being defined by the shuffle matrix of the frame shuffle mode [6][7]. By way of example, for the "Tree" mode considered in the numerical application presented in FIG. 4, $FS_7=\{0,1,5\}$ is for example obtained.

Numerical Application

Introduction of Protection by Means of RCPC Codes

One easy way of applying different levels of protection to different parts of the same data stream is to vary the level or protection ratio by making use of RCPC codes [5]. These codes offer a low complexity and allow different coding rates to be reached according to a pre-defined table, offering an error probability over a bounded AWGN channel (by using the Union boundary) by [5]:

$$P_e \leq \frac{1}{P} \sum_{d=d_{free}}^{\infty} a_d \cdot P_d \quad (9)$$

with $d_{free}$ the free distance of the code, $a_d$ the number of existing pathways, $$P_d = \frac{1}{2} \text{erfc}\left(\sqrt{\frac{d \cdot E_S}{N_o}}\right)$$

the probability that an incorrect pathway at a distance d (with respect to a correct pathway) is selected for a signal-to-noise ratio $SNR=E_S/N_0$.

Accordingly, the end-to-end distortion for a video stream compressed according to the H.264/AVC standard, protected by an RCPC code, and transmitted over an AWGN channel can therefore be estimated using this probability $P_e$. Similarly, the use of any other correction code could be estimated by calculating its error probability $P_e$, for example by means of a Union boundary.

Choice of the Best Compression/Distortion Compromise

According to a first variant embodiment, the method according to the invention offers the possibility of selecting the best compromise between the protection and the compression for a given operating point.

For this purpose, it implements the following steps:
 determine several values of sensitivity for different configurations of source and channel coding for a given overall bit-rate for the channel, using the expressions (6) or (7),
 select the pair of values giving an optimized operation for the data transmission channel.

Figure 2:
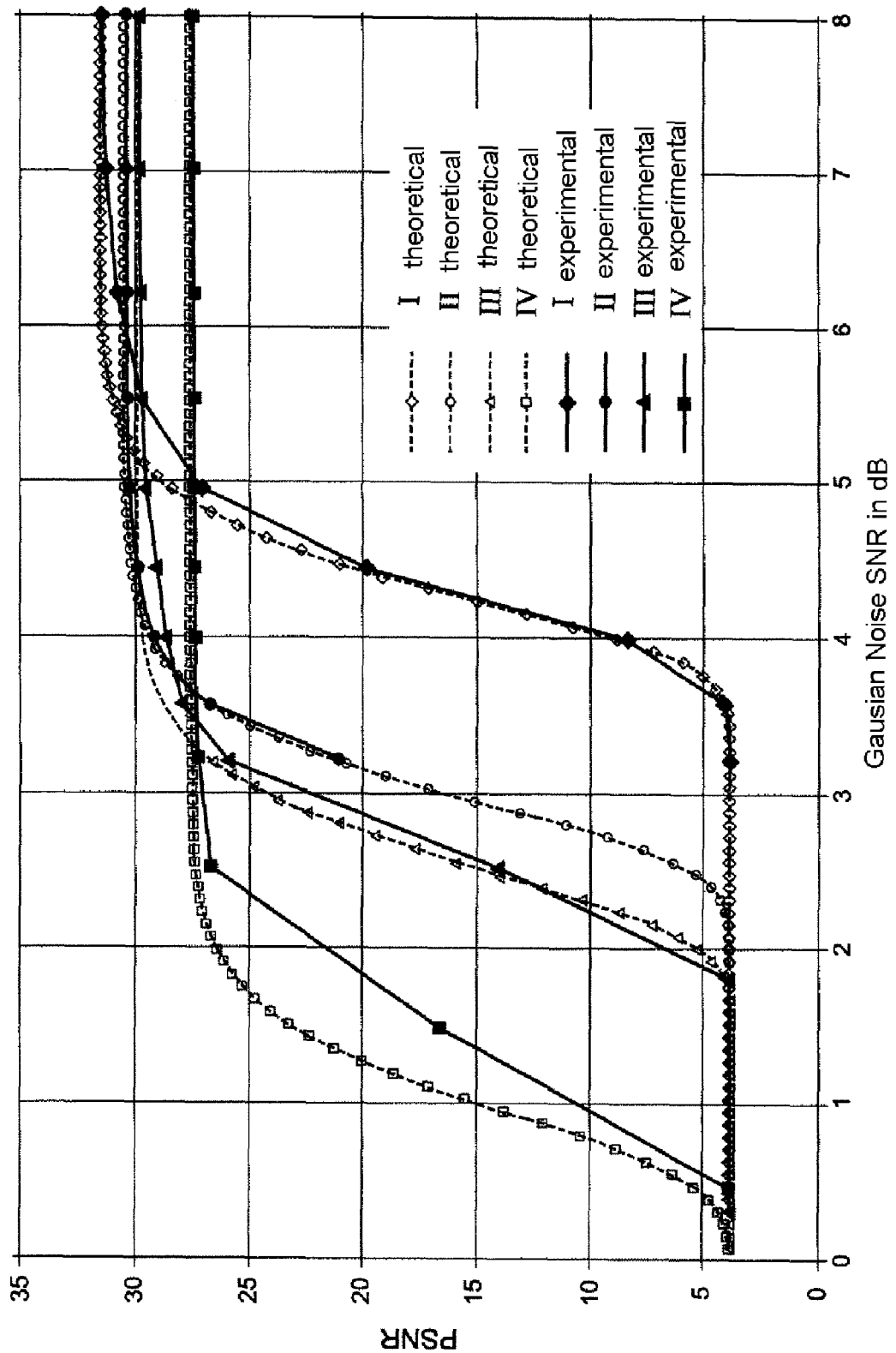
FIG. 2: different results obtained in the case of the estimation for several embodiments of pairs compression ratio, redundancy ratio applied to the ITU 'Foreman' reference sequence.

This way of proceeding is illustrated in FIG. 2 where analytical and simulated sensitivities have been obtained for the ITU reference sequence known from the prior art as 'Foreman' sequence in a QCIF format, 15 Hz, for different values of compression/protection ratio for an overall bit-rate over the channel of 64 kbps. In this FIG. 2, the theoretical and experimental curves have been plotted for different values of coding ratio.

| $I_{theoretical}$ = 0.66 | $II_{theoretical}$ = 0.5 | $III_{theoretical}$ = 0.44 | $IV_{theoretical}$ = 0.33 |
|---|---|---|---|
| $I_{experimental}$ = 0.66 | $II_{experimental}$ = 0.5 | $III_{experimental}$ = 0.44 | $IV_{experimental}$ = 0.33 |

It can be seen that the model represents relatively well the reality corresponding to the simulated data, and that the configuration providing the best video display, here determined by the best PSNR, is readily determined for a given operating point. For example, for an operating point SNR=3 dB, the best configuration from amongst the four proposed is to compress the video sequence to a source rate of 21.3 kbps, then to protect the resulting stream with an error correction code with an efficiency of ⅓, which allows over 5 dB to be gained in PSNR with respect to the other possible configurations.

Unequal Error Protection in the Data Partitioning Mode

According to another variant embodiment, the method according to the invention allows the different protection ratios applicable in an unequal error protection, or UEP, context to be determined, in particular when the H.264/AVC coder operates in the DP (data partitioning) mode. The different partitions of the frame exhibit different sensitivities. Using equation (7), it is possible to choose the optimal parameters for the RCPC operating point for each partition, by comparing the expected resulting distortion for different configurations of the coding parameters.

Figure 3:
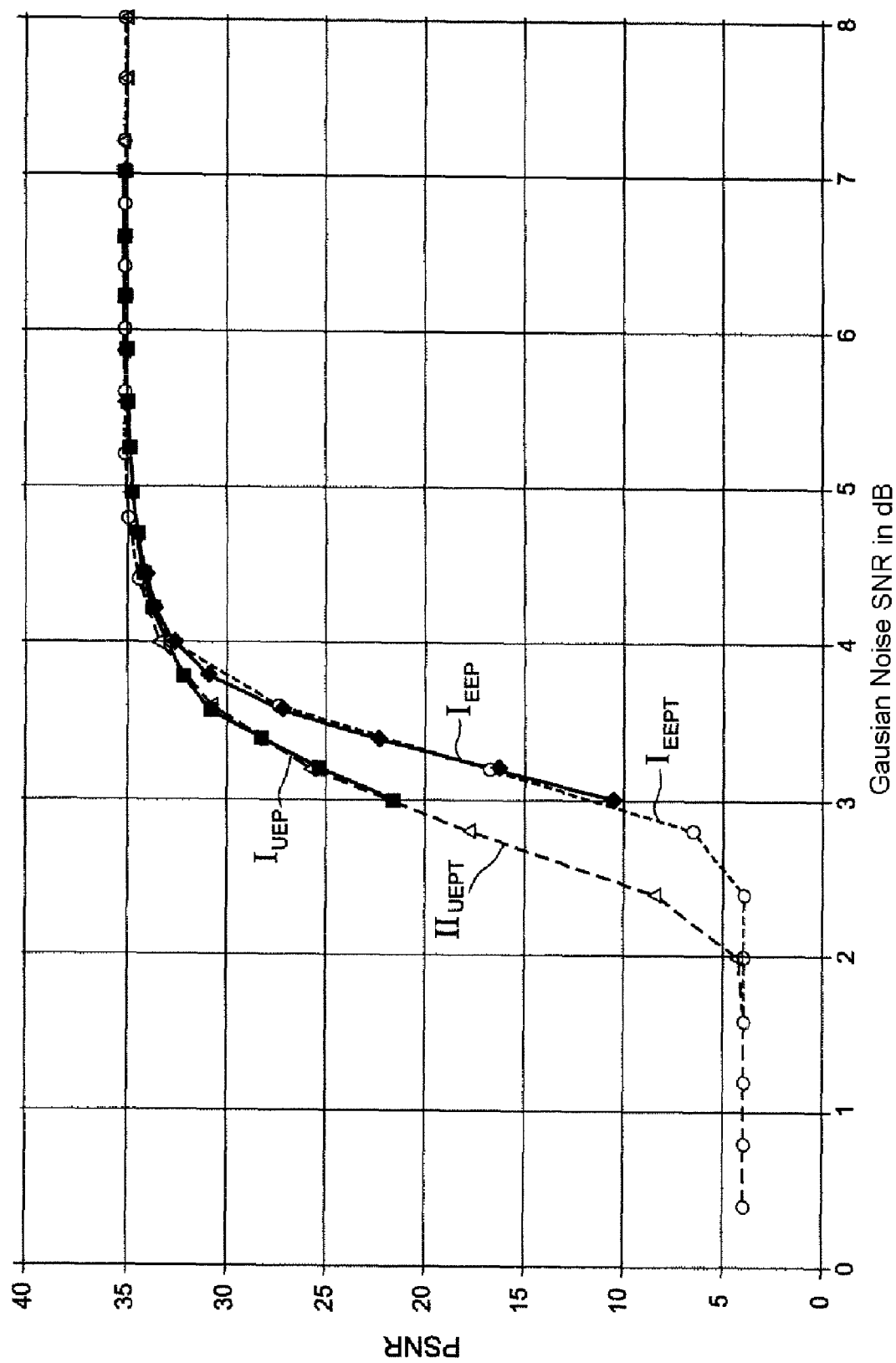
FIG. 3: different results comparing the performances obtained by employing the data partition (DP) mode in the case of application of an equal protection or of an unequal protection to the different slices of the sequence, applied to the 'Foreman' reference sequence.

In FIG. 3, several curves obtained for the 'Foreman' sequence for a mean protection ratio R=1/2 in the EEP and UEP modes are plotted. In this latter case, the perforation ratio of the Intra partition has been reduced to 0.44, whereas that of the NAL-C has been increase by 0.57 to reach the same channel bit-rate of 64 kbps, thus offering gains of 5 to 10 dB in terms of PSNR compared with the EEP mode.

| $I_{EEP}$ = experimental curve obtained with the EEP mode | $II_{UEP}$ = experimental curve obtained with the UEP mode |
|---|---|
| $I_{EEPT}$ = theoretical curve obtained with the EEP mode | $II_{UEPT}$ = theoretical curve obtained with the UEP mode |

Unequal Error Protection in the Frame Shuffle Mode

According to one other variant embodiment, the method according to the invention allows the different protection ratios to be determined that are applicable in the case where the H.264/AVC coder operates in the frame-shuffle mode, and thus the most favorable unequal error protection, or UEP, efficiencies to be determined. In this case, using equation (8) and defining the sets $FS_i$ according to the chosen shuffle mode, it is possible to choose the best parameters for the RCPC operating point for each partition by comparing the expected resulting distortion for different configurations of the coding parameters.

Figure 4:
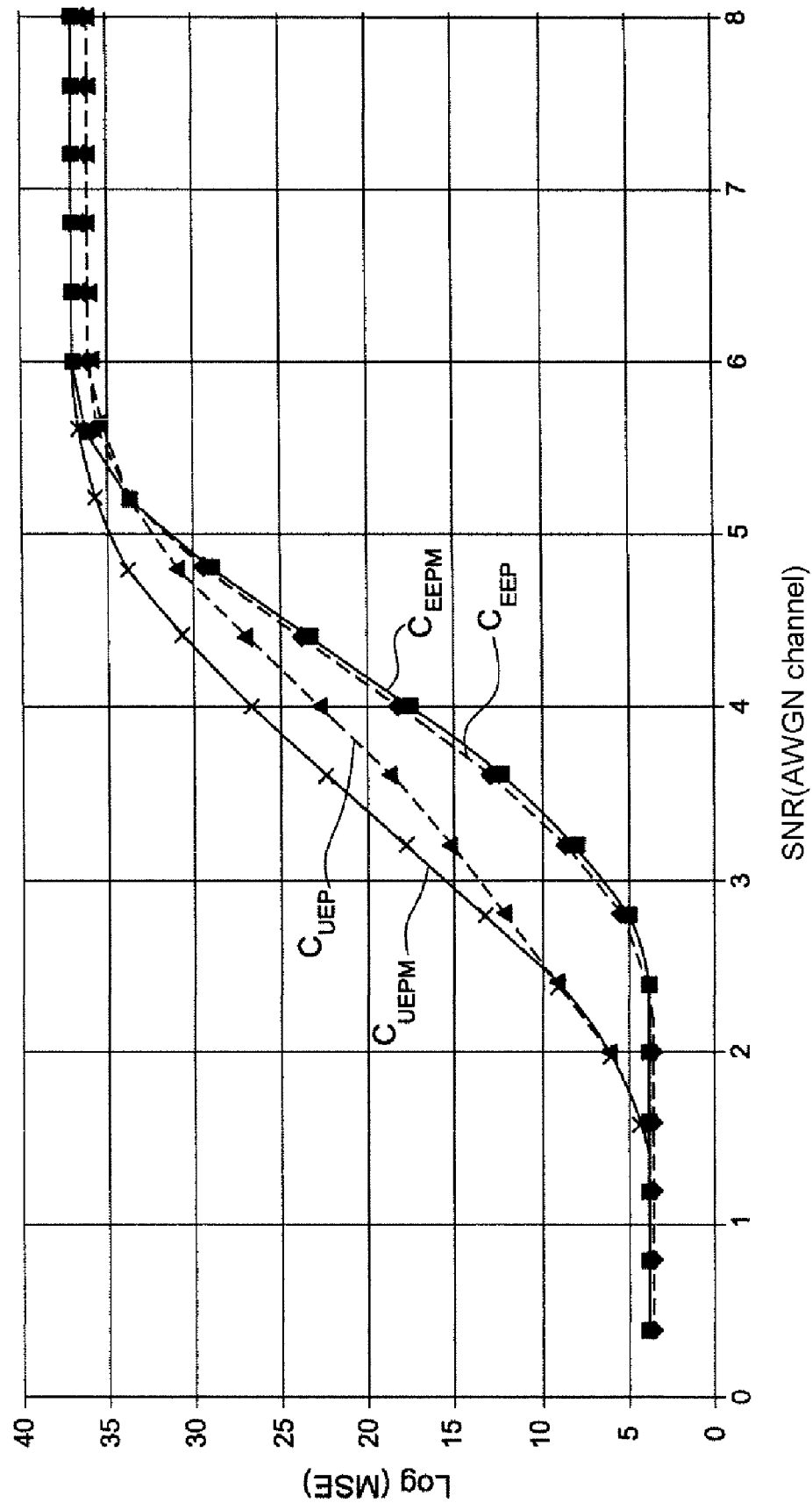
FIG. 4: different results comparing the performances obtained by employing the frame-shuffle (FS [6]) mode in the case of application of an equal protection EEP or of an unequal protection UEP to the different slices of the sequence, applied to the 'Foreman' reference sequence.

In FIG. 4, several curves obtained for the 'Foreman' sequence (QCIF, 15 Hz, one slice per frame) have been plotted for a mean protection ratio R=1/2 in the EEP and UEP modes for, on the one hand, a conventional coding (with no frame shuffle) and, on the other, the "Tree" frame shuffle [7] (with the index M on the curves) with three levels of sensitivity. The tests have been carried out for a total channel bit-rate of 189 kbit/s corresponding, for UEP in normal mode, to efficiencies $R_{Intra}=8/20$, $R_{Predicted}=8/14$ and, for UEP in frame-shuffle mode to protection efficiencies $R_{Intra}=8/20$, $R_{Predicted1}=8/16$, $R_{Predicted2}=R_{Predicted3}=8/12$.

The gain provided by the frame shuffle [6] with respect to the normal coding mode is notably seen at high SNR, since the gain in compression efficiency leads to a better PSNR, and it is observed that the application of unequal protection (UEP) allows even more to be gained, either with respect to the EEP frame-shuffle mode (gains of at least 5 dB in PSNR observed) or with respect to the conventional coding UEP mode (gains of around 3 dB in PSNR), all of which will allow those skilled in the art to draw conclusions on the advantages of the compression/protection optimization in the frame-shuffle mode, which sees the two techniques of optimization and of frame shuffle combine their contributions in order to deliver an even better result.

[1] M. Bystrom and T. Stockhammer, "Dependent source and channel bit-rate allocation for video transmission", in *IEEE Trans. on Wireless Comm.*, vol. 3, n. 1, pp. 258-268, January 2004.

[2] M. G. Martini and M. Chiani, "Rate-Distortion models for Unequal Error Protection for wireless video transmission", in *Proc. IEEE Vehicular Technology Conference (VTC '04)*, pp. 1049-1053, 2004.

[3] C. Lamy-Bergot, N. Chautru and C. Bergeron, "Unequal Error Protection for H.263+ bitstreams over a wireless IP network", to appear in *Proc. of the IEEE ICASSP '06 conference*, Toulouse, France, May 2006.

[4] C. Bergeron and C. Lamy-Bergot, "Compliant selective encryption for H.264/AVC video streams", *Proc. Int. Workshop on Multimedia Processing (MMSP '05)*, pp. 477-480, Shanghai, China, October-November 2005.

[5] J. Hagenauer, "Rate-compatible punctured convolutional codes (RCPC codes) and their application," in *IEEE Trans. on Comm.*, vol. 36, n. 4, pp. 339-400, April 1988.

[6] C. Lamy-Bergot and C. Bergeron, "Procédé et dispositif de mélange de trames vidéo pour obtenir de la granularité temporelle" (*Video frame-shuffle method and device in order to obtain temporal granularity*) French patent application number FR04/08802, August 2004.

[7] C. Bergeron, C. Lamy-Bergot, G. Pau, and B. Pesquet-Popescu, *Temporal Scalability through Adaptive M-Band Filter Banks for Robust H.264/MPEG-4 AVC Video Coding*, EURASIP Journal on Applied Signal Processing 2006 (2006), Article ID 21930, 11 pages.

The invention claimed is:

1. A method of determining operating parameters for a multimedia data transmission channel, comprising the steps of:
   receiving information about a state of the channel;
   utilizing the received information to determine sensitivity values for a plurality of predetermined pairs of compression ratio and protection ratio, for a given overall fixed source bit-rate of the channel;
   comparing the sensitivity values obtained for the given overall fixed source bit-rate of the channel; and
   selecting a preferred sensitivity value, the preferred sensitivity value taking into account a desired source bit-rate and a compression ratio;
   wherein the sensitivity value is determined according to the following relationship:

$$\hat{D}_{gop} = \prod_{i=0}^{N}(1-P_e)^{\beta_i n_i} \cdot D_o + \sum_{i=0}^{N}\left[\prod_{j=0}^{i-1}(1-P_e)^{\beta_j n_j} \cdot (1-(1-P_e)^{\beta_i n_i}) \cdot D_{loss_i}\right]$$

wherein $\hat{D}_{gop}$ is a distortion of a group of pictures, $P_e$ is a probability of error for a bit, $\beta_i$ is a correction factor for an $i^{th}$ frame, $\beta_j$ is a correction factor for an $j^{th}$ frame, N is a number of frames, $n_i$ is a size of an $i^{th}$ frame, $n_j$ is a size of an $j^{th}$ frame, $D_o$ is distortion observed when a frame is correct, and $D_{loss_i}$ is distortion observed when an $i^{th}$ frame is lost.

2. A method of determining operating parameters for a multimedia data transmission channel, comprising the steps of:
   receiving information about a state of the channel;
   determining sensitivity values for a plurality of predetermined pairs of compression ratio and protection ratio, for a given overall fixed source bit-rate of the channel;
   comparing the sensitivity values obtained for the given overall fixed source bit-rate of the channel;
   selecting a preferred sensitivity value, the preferred sensitivity value taking into account a desired source bit-rate and a compression ratio;
   separating the data into partitions; and
   determining preferred compression and protection ratios for at least a portion of the partitions according to the following relationship:

$$\hat{D}_{gop_{DP}} = \prod_{i=0}^{N}\prod_{k=1}^{3}(1-P_e)^{(1-\beta_{i,k})n_{i,k}} \cdot D_o + \sum_{i=0}^{N}\sum_{k=1}^{3}\left[\prod_{j=0}^{N}\prod_{l=1}^{k-1}(1-P_e)^{\beta_{j,l}n_{j,l}}\right.$$
$$\left.\prod_{j=0}^{i-1}(1-P_e)^{\beta_{j,k}n_{j,k}}\left(1-(1-P_e)^{(1-\beta_{i,k})n_{i,k}}\right) \cdot D_{loss_{i,k}}\right],$$

wherein $\hat{D}_{gop_{DP}}$ is a distortion of a group of pictures for the partitions, $P_e$ is a probability of error for a bit, $\beta_{i,k}$ is a correction factor for an $i^{th}$ frame of a $k^{th}$ partition, $\beta_{j,l}$ is a correction factor for a $j^{th}$ frame of an $l^{th}$ partition, $\beta_{j,k}$ is a correction factor for a $j^{th}$ frame of an $k^{th}$ partition, N is a number of frames, $D_o$ is distortion observed when a frame is correct, $n_{i,k}$ is a length of an $i^{th}$ frame of a $k^{th}$ partition, $n_{j,l}$ is a length of an $j^{th}$ frame of an $l^{th}$ partition, $n_{j,k}$ is a length of an $j^{th}$ frame of an $k^{th}$ partition, $D_{loss_{i,k}}$ is a distortion observed if an $i^{th}$ frame of a $k^{th}$ partition is lost, and $$n_i = \sum_{k=1}^{3} n_{i,k}.$$

3. The method as claimed in claim 2, wherein a predicted frame is transmitted in at most three slices.

4. A method of determining operating parameters for a multimedia data transmission channel, comprising the steps of:
- receiving information about a state of the channel;
- determining sensitivity values for a plurality of predetermined pairs of compression ratio and protection ratio, for a given overall fixed source bit-rate of the channel;
- comparing the sensitivity values obtained for the given overall fixed source bit-rate of the channel;
- selecting a preferred sensitivity value, the preferred sensitivity value taking into account a desired source bit-rate and a compression ratio;
- separating the data into partitions; and
- determining the compression ratio and the protection ratio for at least a portion of the partitions according to the following relationship:

$$\hat{D}_{gop} = \prod_{i=0}^{N}(1-P_e)^{\beta_i n_i} \cdot D_o + \sum_{i=0}^{N}\left[\prod_{j,j\in FS_i}(1-P_e)^{\beta_j n_j} \cdot (1-(1-P_e)^{\beta_i n_i}) \cdot D_{loss_i}\right]$$

wherein $\hat{D}_{gop}$ is a distortion of a group of pictures, $P_e$ is a probability of error for a bit, $\beta_i$ is a correction factor for an $i^{th}$ frame, $\beta_j$ is a correction factor for a $j^{th}$ frame, N is a number of frames, $n_i$ is a size of an $i^{th}$ frame, $n_j$ is a size of an $j^{th}$ frame, $D_o$ is distortion observed when a frame is correct, and $D_{loss_i}$ is distortion observed when an $i^{th}$ frame is lost, and wherein data are shuffled by a frame shuffle process of a frame shuffle mode; and $FS_i$ is a set of the frames on which a frame i depends, the set being defined by a shuffle matrix of the frame shuffle mode.

5. The method as claimed in claim 4, wherein the shuffle mode is a mode offering "Tree" granularity.

6. The method as claimed in claim 1, wherein an RCPC protection code is used for transmitted data.

7. The method as claimed in claim 1, wherein a H.264/AVC video standard is used for the data transmission.

8. A device to determine operating parameters for a multimedia data transmission channel, comprising at least one adaptation module, wherein the adaptation module is configured:
- to receive information on a state of the multimedia data transmission channel and information on efficiency available for coders; and
- to generate coding rules, including values of a video compression ratio and of a protection ratio, by implementing a method according to claim 4.

9. A device to determine operating parameters for a multimedia data transmission channel, comprising at least one adaptation module, wherein the adaptation module is configured:
- to receive information on a state of the multimedia data transmission channel and information on efficiency available for coders; and
- to generate coding rules, including values of a video compression ratio and of a protection ratio, by implementing a method according to claim 1.

10. A device to determine operating parameters for a multimedia data transmission channel, comprising at least one adaptation module, wherein the adaptation module is configured:
- to receive information on a state of the multimedia data transmission channel and information on efficiency available for coders; and
- to generate coding rules, including values of a video compression ratio and of a protection ratio, by implementing a method according to claim 2.

11. The method as claimed in claim 2, wherein an RCPC protection code is used for transmitted data.

12. The method as claimed in claim 2, wherein a H.264/AVC video standard is used for the data transmission.

13. The method as claimed in claim 4, wherein an RCPC protection code is used for transmitted data.

14. The method as claimed in claim 4, wherein a H.264/AVC video standard is used for the data transmission.

15. The method as claimed in claim 2, wherein the sensitivity value is determined according to the following relationship:

$$\hat{D}_{gop} = \prod_{i=0}^{N}(1-P_e)^{\beta_i n_i} \cdot D_o + \sum_{i=0}^{N}\left[\prod_{j=0}^{i-1}(1-P_e)^{\beta_j n_j} \cdot (1-(1-P_e)^{\beta_i n_i}) \cdot D_{loss_i}\right]$$

wherein $\hat{D}_{gop}$ is a distortion of a group of pictures, $P_e$ is a probability of error for a bit, $\beta_i$ is a correction factor for an $i^{th}$ frame, $\beta_j$ is a correction factor for a $j^{th}$ frame, N is a number of frames, $n_i$ is a size of an $i^{th}$ frame, $n_j$ is a size of an $j^{th}$ frame, $D_o$ is distortion observed when a frame is correct, and $D_{loss_i}$ is distortion observed when an $i^{th}$ frame is lost.

16. The method as claimed in claim 4, wherein the sensitivity value is determined according to the following relationship:

$$\hat{D}_{gop} = \prod_{i=0}^{N}(1-P_e)^{\beta_i n_i} \cdot D_o + \sum_{i=0}^{N}\left[\prod_{j=0}^{i-1}(1-P_e)^{\beta_j n_j} \cdot (1-(1-P_e)^{\beta_i n_i}) \cdot D_{loss_i}\right]$$

wherein $\hat{D}_{gop}$ is a distortion of a group of pictures, $P_e$ is a probability of error for a bit, $\beta_i$ is a correction factor for an $i^{th}$ frame, $\beta_j$ is a correction factor for a $j^{th}$ frame, N is a number of frames, $n_i$ is a size of an $i^{th}$ frame, $n_j$ is a size of an $j^{th}$ frame, $D_o$ is distortion observed when a frame is correct, and $D_{loss_i}$ is distortion observed when an $i^{th}$ frame is lost.

17. The method as claimed in claim 1, further comprising the steps of:
- separating the data into partitions; and
- determining preferred compression and protection ratios for at least a portion of the partitions according to the following relationship:

$$\hat{D}_{gop_{DP}} = \prod_{i=0}^{N}\prod_{k=1}^{3}(1-P_e)^{(1-\beta_{i,k})n_{i,k}} \cdot D_o + \sum_{i=0}^{N}\sum_{k=1}^{3}\left[\prod_{j=0}^{N}\prod_{l=1}^{k-1}(1-P_e)^{\beta_{j,l}n_{j,l}}\prod_{j=0}^{i-1}(1-P_e)^{\beta_{j,k}n_{j,k}}\left(1-(1-P_e)^{(1-\beta_{i,k})n_{i,k}}\right) \cdot D_{loss_{i,k}}\right],$$

wherein $\hat{D}_{gop_{DP}}$ is a distortion of a group of pictures for the partitions, $P_e$ is a probability of error for a bit, $\beta_{i,k}$ is a correction factor for an $i^{th}$ frame of a $k^{th}$ partition, $\beta_{j,l}$ is a correction factor for a $j^{th}$ frame of an $l^{th}$ partition, $\beta_{j,k}$ is a correction factor for a $j^{th}$ frame of an $k^{th}$ partition, N is a number of frames, $D_o$ is distortion observed when a frame is correct, $n_{i,k}$ is a length of an $i^{th}$ frame of a $k^{th}$ partition, $n_{j,l}$ is a length of an $j^{th}$ frame of an $l^{th}$ partition, $n_{j,k}$ is a length of an $j^{th}$ frame of an $k^{th}$ partition, $D_{loss_{i,k}}$ is a distortion observed if an $i^{th}$ frame of a $k^{th}$ partition is lost, and $$n_i = \sum_{k=1}^{3} n_{i,k}.$$

18. The method as claimed in claim 1, further comprising the step of:
separating the data into partitions; and
determining the compression ratio and the protection ratio for at least a portion of the partitions according to the following relationship:

$$\hat{D}_{gop} = \prod_{i=0}^{N} (1 - P_e)^{\beta_i n_i} \cdot D_o + \sum_{i=0}^{N} \left[ \prod_{j,j \in FS_i} (1 - P_e)^{\beta_j n_j} \cdot (1 - (1 - P_e)^{\beta_i n_i}) \cdot D_{loss_i} \right]$$

wherein $\hat{D}_{gop}$ is a distortion of a group of pictures, $P_e$ is a probability of error for a bit, $\beta_i$ is a correction factor for an $i^{th}$ frame, $\beta_j$ is a correction factor for a $j^{th}$ frame, N is a number of frames, $n_i$ is a size of an $i^{th}$ frame, $n_j$ is a size of an $j^{th}$ frame, $D_o$ is distortion observed when a frame is correct, and $D_{loss_i}$ is distortion observed when an $i^{th}$ frame is lost, and wherein data are shuffled by a frame shuffle process of a frame shuffle mode; and $FS_i$ is a set of the frames on which a frame i depends, the set being defined by a shuffle matrix of the frame shuffle mode.

\* \* \* \* \*